United States Patent
Kane

(10) Patent No.: US 9,172,593 B2
(45) Date of Patent: Oct. 27, 2015

(54) SYSTEM AND METHOD FOR IDENTIFYING PROBLEMS ON A NETWORK

(71) Applicant: EMPIRIX INC., Billerica, MA (US)

(72) Inventor: Cameron Kane, Billerica, MA (US)

(73) Assignee: EMPIRIX INC., Billerica, MA (US)

( * ) Notice: Subject to any disclaimer, the term of this patent is extended or adjusted under 35 U.S.C. 154(b) by 286 days.

(21) Appl. No.: 13/939,529

(22) Filed: Jul. 11, 2013

(65) Prior Publication Data

US 2015/0019916 A1  Jan. 15, 2015

(51) Int. Cl.
*G06F 11/00* (2006.01)
*H04L 12/24* (2006.01)
*G06F 11/07* (2006.01)
*G06F 21/55* (2013.01)

(52) U.S. Cl.
CPC .............. *H04L 41/00* (2013.01); *G06F 11/079* (2013.01); *G06F 11/0766* (2013.01); *G06F 21/554* (2013.01)

(58) Field of Classification Search
CPC .. G06F 11/0766; G06F 11/079; G06F 21/554
USPC ................................ 714/26, 37, 52
See application file for complete search history.

(56) References Cited

U.S. PATENT DOCUMENTS

| 7,159,237 | B2 | 1/2007 | Schneier et al. |
| 2009/0097397 | A1* | 4/2009 | Moreira Sa de Souza .... 370/216 |
| 2009/0196186 | A1 | 8/2009 | Lidstrom et al. |
| 2010/0179829 | A1* | 7/2010 | Gedeon et al. ..................... 705/3 |
| 2011/0078302 | A1* | 3/2011 | Dehaan et al. ................ 709/224 |
| 2012/0224469 | A1* | 9/2012 | Erke et al. ..................... 370/221 |
| 2013/0227352 | A1* | 8/2013 | Kumarasamy et al. ...... 714/47.1 |
| 2014/0089418 | A1* | 3/2014 | Davenport et al. ........... 709/206 |
| 2014/0189861 | A1* | 7/2014 | Gupta et al. ..................... 726/22 |
| 2014/0278032 | A1* | 9/2014 | Scofield ........................ 701/118 |

FOREIGN PATENT DOCUMENTS

| EP | 1764981 A1 | 3/2007 |
| WO | WO-2012-113511 A1 | 8/2012 |
| WO | WO-2013-098812 A1 | 7/2013 |

OTHER PUBLICATIONS

International Search Report issued in PCT/US2014/03316 on Aug. 8, 2014.

* cited by examiner

*Primary Examiner* — Chae Ko
(74) *Attorney, Agent, or Firm* — Venable LLP; Jeffri A. Kaminski; Todd R. Farnsworth

(57) ABSTRACT

Aspects of the invention may involve systems, methods, and computer readable medium. In an embodiment, a telecommunications network may contain telecommunications probes capable of generating detailed records describing network events. The telecommunications probes may be coupled to computer processors and/or memory. The memory may store detailed records created by the probes and instructions executable by the processors. The instructions may be to: identify detailed records that indicate an event failure including error codes and associated subscriber identifiers; learn a distribution of error codes and associated subscriber identifiers; detect event failures that indicate an increase in the number of subscriber identifiers for an error code; analyze attributes of the detected event failures to identify common attributes between the detected event failures; prepare a report identifying a network issue based on the identified common attributes between the detected event failures; transmit the report; and receive feedback based on the report.

17 Claims, 4 Drawing Sheets

SYSTEM AND METHOD FOR IDENTIFYING PROBLEMS ON A NETWORK

FIELD OF INVENTION

The present invention relates to detecting and determining problems on a network and more specifically to problems on a telecommunications network.

SUMMARY

Aspects of the invention may involve systems, methods, and computer readable medium. In one embodiment of the invention, a system may exist for identifying communication problems. The system may include a telecommunications network; one or more telecommunications probes coupled to the telecommunications network, the telecommunications probes capable of generating detailed records describing one or more network events; one or more processors in communication with the telecommunications probes; and memory coupled to the one or more processors, the memory storing the detailed records received by the telecommunications probes and the memory storing instructions executable by the one or more processors, the instructions operable to: identify detailed records that indicate an event failure including error codes and associated subscriber identifiers; learn a distribution of error codes and associated subscriber identifiers; detect event failures that indicate an increase in the number of subscriber identifiers for an error code; analyze attributes of the detected event failures to identify one or more common attributes between the detected event failures; prepare a report identifying a network issue based on the identified one or more common attributes between the detected event failures; transmit the report; and receive feedback based on the report.

In another embodiment of the invention, a method may exist for identifying communication problems. The method may include loading, by a computer, a first plurality of detailed records, wherein the detailed records contain attributes for one or more network events; identifying, by the computer, a second plurality of detailed records from the first plurality of detailed records, wherein the second plurality of detailed records indicate an event failure; detecting, by the computer, a signature in the second plurality of detailed records, wherein the signature is a pattern indicating a known failure type and associated attributes; learning, by the computer, a typical pattern of attributes associated with the signature; identifying, by the computer, a deviation from the learned pattern; detecting, by the computer, one or more common attributes in a plurality of event failures based on the deviation from the learned pattern; determining, by the computer, a problem based on the one or more common attributes in a plurality of event failures; reporting, by the computer, the problem; and receiving, by the computer, input on the problem.

In another embodiment, a non-transitory computer-readable medium may include instructions executable by one or more processors to identify communication problems. The computer-readable medium may include one or more instructions for: loading a first plurality of detailed records, wherein the detailed records contain attributes for one or more network events; identifying a second plurality of detailed records from the first plurality of detailed records, wherein the second plurality of detailed records indicate an event failure; detecting a signature in the second plurality of detailed records, wherein the signature is a pattern indicating a known failure type and associated attributes; learning a typical pattern of attributes associated with the signature; identifying a deviation from the learned pattern; detecting one or more common attributes in a plurality of event failures based on the deviation from the learned pattern; determining a problem based on the one or more common attributes in a plurality of event failures; reporting the problem; and receiving input on the problem.

BRIEF DESCRIPTION OF THE DRAWINGS

The foregoing and other features and advantages of the invention will be apparent from the following, more particular description of various embodiments, as illustrated in the accompanying drawings wherein like reference numbers generally indicate identical, functionally similar, and/or structurally similar elements. The first digits in the reference number indicate the drawing in which an element first appears.

DESCRIPTION OF THE EMBODIMENTS

Figure 1:
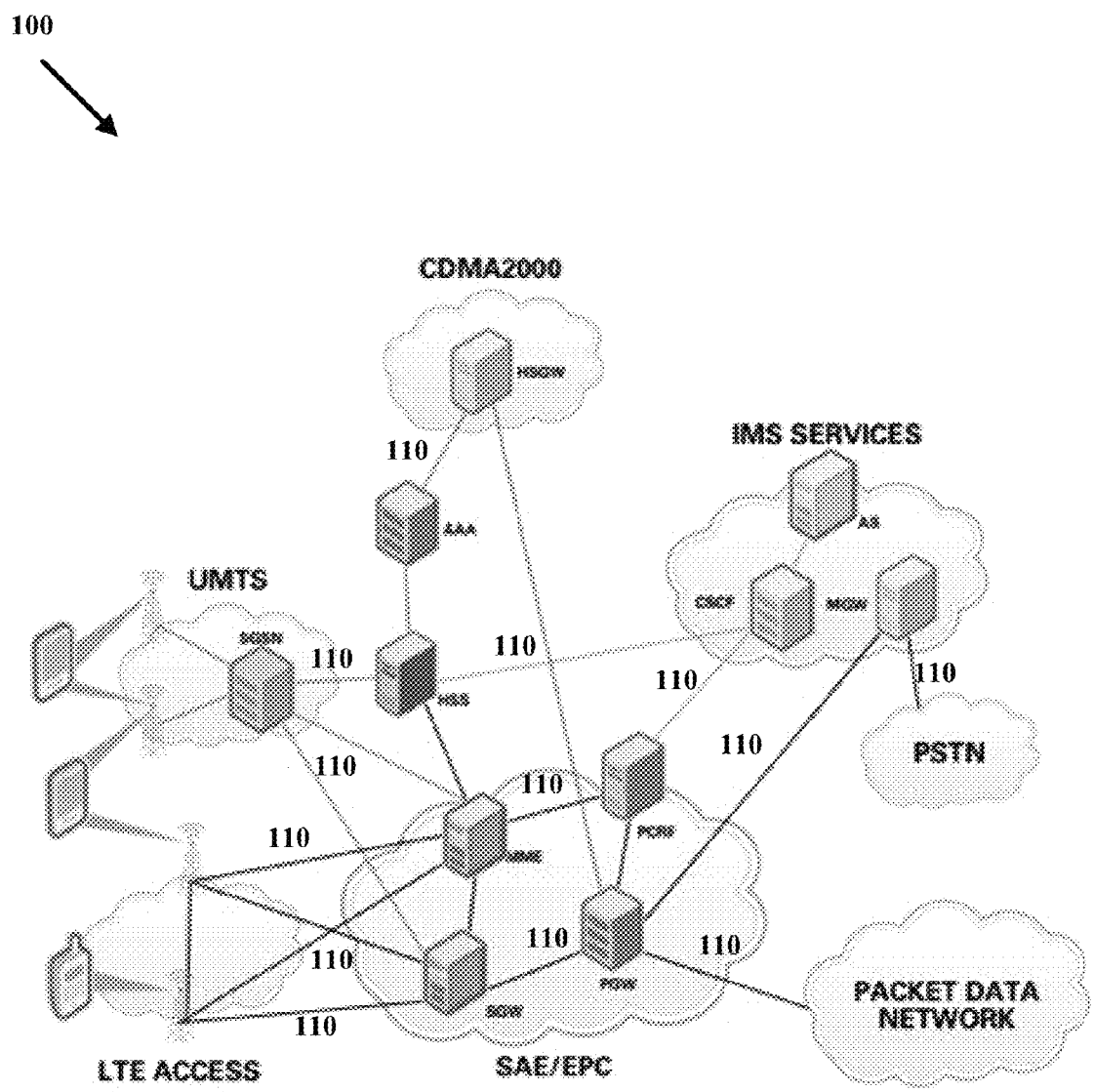
FIG. 1 shows an example telecommunication network for use with an illustrative embodiment.

Illustrative embodiments are discussed in detail below. While specific embodiments are discussed, it should be understood that this is done for illustration purposes only. In describing and illustrating the embodiments, specific terminology is employed for the sake of clarity. However, the embodiments are not intended to be limited to the specific terminology so selected. A person skilled in the relevant art will recognize that other components and configurations may be used without departing from the spirit and scope of the embodiments. It is to be understood that each specific element includes all technical equivalents that operate in a similar manner to accomplish a similar purpose. The examples and embodiments described herein are non-limiting examples.

All publications cited herein are hereby incorporated by reference in their entirety.

As used herein, the term "a" refers to one or more. The terms "including," "for example," "such as," "e.g.," "may be" and the like, are meant to include, but not be limited to, the listed examples. The term "product" may refer to both products and services.

Overview

An embodiment of the invention may provide or utilize the following components:

A call detail record (CDR) may be an record that is automatically generated on completion of a telephone call or data session (e.g., SMS, Internet access, phone on, phone connect to the network, acquiring new base station, or any normal transactional process associated with the mobility management and usage of the application or call protocol layers). A CDR may be related to call events.

A transaction detail record (TDR) may be an automatic record generated on the completion of a transaction on the telecommunications network not normally associated with a call (e.g., a SMS, a data session, a phone registering on the network). The TDR may contain at least the same attributes as the CDR. A TDR may contain more transactional data (e.g., registering a phone on a network) than a CDR.

x-Detail Record (xDR) or detail record may be a term used to describe a generic call or transaction detail record and may cover both a CDR and TDR. The detail records may include information and attributes such as telephone numbers of requesting and receiving devices, location of devices, communication paths used (e.g., base station, signal towers), network element, time, GGSN, SGSN, handset, APN, cell technology, radio technology (e.g., 2/3G), roaming type, country, carrier, source number, destination number, destination category, destination nature of address, destination numbering plan, OPC/DPC, release location, routing natr, routing numbering plan, source category, source natr, source numbering plan, teleservice information, transmission media requirement, trunk, quality attribute (e.g., call success), mean opinion score (e.g., the quality voice transmission), The detail records may include a quality indicator of some sort, a success ratio of the transaction (e.g., "did my registration on the network succeed or not"), and/or a scalar value (e.g., "I received 10 Mbit/s throughput on web browsing." These metrics may be presented in the detail records alongside other attributes such as the cell, network element, application, user identifier, handset identifier, etc.

User equipment (UE) may be a term used to describe a device used to make a call, access data on a telecommunications network, etc. A UE may be a handset, an application, or any other device that connects to a telecommunications network (e.g. a credit card swiping machine in a store).

Telecommunications probes or multi-service probes (MSP) may generate CDR, TDR, or xDRs and transmit to a landing zone. MSPs analyze data transmitted by UE and other equipment on a network.

Landing zone may be a centralized computer system that receive xDRs from MSPs. The landing zone may execute software implementations of various network analysis algorithms such as Subscriber Impact and Why it Happened.

Subscriber Impact and Why it Happened (SIWIH) may describe an embodiment of the invention to determine a network issue and may automatically record the number of users experiencing network problems and signal telecommunications operators of specific network events.

The number of users experiencing network problems may be system definable (e.g., 100 users). The number of users may be definable by the telecommunications operator such that, for example, many problems affecting one person does not alert the telecommunications operator but one problem affecting 100 users would produce an alert.

Global System for Mobile communications (GSM) is an international standard for the interaction of mobile UEs on a telecommunications network including radio base stations.

Code Division Multiple Access (CDMA2000) is a 3G technology, popular is the US, that may be an alternative to GSM and UMTS.

Universal Mobile Telecommunications System (UMTS) is a 3G technology that may be an alternative to CDMA2000.

Long Term Evolution (LTE) a 4G technology.

Public Switched Telephone Network (PSTN) the original telephone switching network based on wire line technology (a VOIP network may interconnect with a traditional PSTN network).

Voice over IP (VOIP) is a set of technologies used to implement voice or video calls over a packet switched IP (internet) network as opposed to a dedicated PSTN.

A spike may be a threshold over which a certain number of users are affected by a particular problem. When a spike is detected, a case may be opened.

A case may be a separate task that attempts to identify for a set of users and for one or more errors what contributing factors were shared across the network events that caused the one or more errors.

In telecommunications networks, whether fixed (e.g., land line voice and/or data) or mobile (e.g., voice, sms, and/or data), situations may arise where users may not be able to achieve an intended objective through the combination of UE (e.g., a mobile or fixed line phone, a VOIP handset, or application running on a computer) and the service provided on a network maintained by a telecommunications service operator.

The activities which may be impaired may include, for example, the ability to initiate or connect a telephone call (e.g. congestion on the network); ability to complete a call that has already started, (e.g. the call drops due to a radio network issue), ability to initiate a connection with the 2, 3G, 4G, etc. mobile network, ability to complete a data session that has already started, (e.g. the connection to the internet service drops), ability to complete the sending of a text message, ability for a UE to register on a roaming network, ability for a UE to connect to a mobile network upon switching on of the device, ability for a UE to continue to stay in communication with the mobile network as the UE moves from one mobile base station (e.g., cell tower) to another. Generally, the classes of activity which may be impaired include making calls, texting, maintaining phone in contact with mobile network, ability to access applications (e.g., web browsing) once a data session is established, and the ability to establish and maintain the session once started.

In one embodiment, the number of users that are experiencing impaired events may be automatically recorded with the distinction that the number of distinct users affected by all problems may be measured all the time. The events may be measured (e.g., observed) from one or more xDRs and recorded along with the number of affected users in a database. The database may be scanned to provide a count of the problems and affected users. Accordingly, telecommunications operators may be alerted to problems that are affecting a defined number of individual subscribers, rather than problems that a few subscribers are having but may be generating a large number of error events on the telecommunications network, for example.

In one embodiment, probes that can decode the telecommunications protocols on the network and can record the events in the form of call or transaction detail records may be placed on the network. Data (e.g., call or transaction detail records) from the probes may be supplied to a computing system running, for example, a SIWIH instruction set.

An embodiment of the invention identifies, for example, problems affecting the most number of users (e.g., subscriber centric), rather than the traditional method of counting the number of errors seen on the network itself (e.g., network centric).

In one embodiment, contributing factors that are common across users that are experiencing network issues may be identified. Contributing factors may include, for example, being part of the same cell site, being the same type of handset, being a roamer from a particular country or foreign network, being related to a particular device on the telecommunications network (called a network element (e.g., a telecommunications voice switch)), being related to a particular customer group (e.g., a corporate wholesale account), being related to all using the same application service (e.g., FACEBOOK), and/or being related to no common factors (e.g., the problem spans all combinations of cell, subscribers, network, service, handset type, application).

Once a spike and then case has been identified, a series of scan dimensions may be scanned in order to build up a set of evidence that may be reported to an end user. Sample reports may include, for example, "10000 individual users are now experiencing congestion on the mobile voice 2G network, and this is primarily related to cell tower: X, handset type:Y" or "2000 individual users are now experiencing inability to connect to 3G data network, and this is primarily related to inbound roamers from country X and mobile operator Y."

Cases may constructed automatically and may be output in some presentation medium, either a log file, database, an application running on a computer, or on a mobile device such as an iPad.

Managers and technical staff who run the network and manage customer care/relationship may use these cases to proactivly target remedial activities on the network to restore customer satisfaction. An embodiment of the invention may be constantly polling the network and may detect issues quicker than may be impossible for humans to determine by manual methods.

Illustrative Systems

FIG. 1 shows an example converged telecommunication network 100 including CDMA (mobile), UMTS (mobile), LTE (4G), and PSTN for use with an illustrative embodiment. Converged telecommunication network 100 depicts connections as lines between communicating devices on the network. Telecommunications probes or multi-service probes (MSP) 110 may be deployed to intercept communication between two network devices (e.g., between the lines shown in network 100) to record any event on the network regardless of technology. The devices on Network 100 Lines may connect and MSP 110 may monitor communication through, devices such as, for example, STPs (signaling transfer point) in SS7, session border controllers in VOIP, SGSN/GGSNs (serving GPRS Service Nodes/Gateway GPRS Service Node) in UMTS and/or PGWs (Packet Gateways) in LTE.

Figure 2:
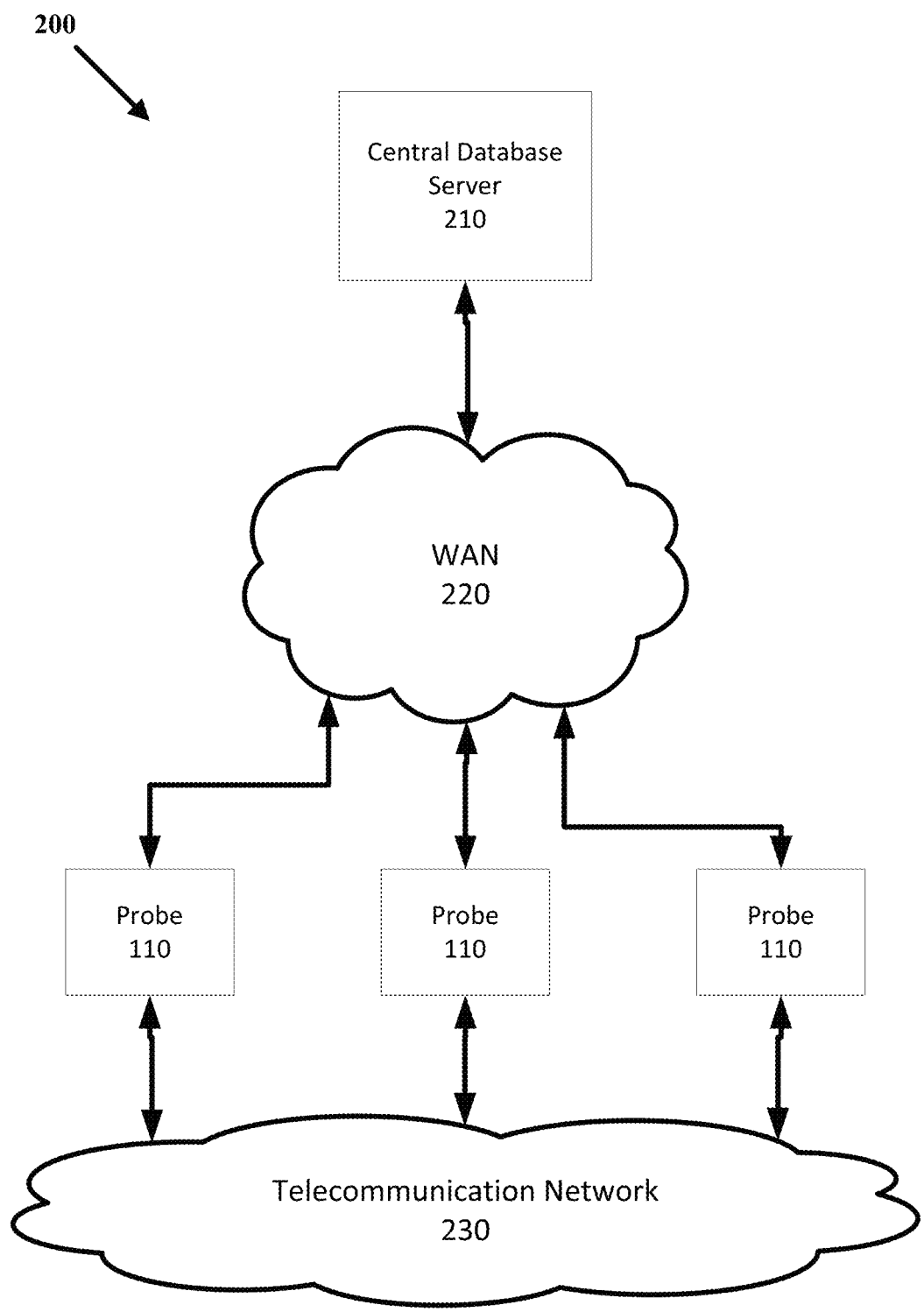
FIG. 2 is a block diagram depicting telecommunication probes and a central processing location for use with an illustrative embodiment.

FIG. 2 is a block diagram 200 depicting MSP 110, central database server 210 (e.g., central processing location), wide area network (WAN) 220, and telecommunications network 230, for use with an illustrative embodiment. The central database server 210 may receive and collate multiple xDRs from multiple MSPs 110. The xDRs may be loaded and stored on one or more databases for analysis. The central database server 210 may be one machine or multiple machines and may be dispersed in multiple locations. The central database server 210 may be located, for example, in the cloud. MSPs 110 may interface with telecommunication network 230 (e.g., via optical/electric IP interface cards) and record, for example, call, application, and/or transaction detail records. MSPs 110 may also connect to WAN 220 and send, for example, call, application, and transaction detail records to the central database server 210. The central database server 210 may receive and store data from one or more MSPs 110 and may calculate the user impact. The central database server 210 may continuously monitor and calculate the current status of the telecommunications network 230. Telecommunications network 230 may include both mobile and fixed telecommunications.

Telecommunications probes or multi-service probes (MSP) 110 may generate call or transaction detail records (CDRs/TDRs). The CDRs or TDRs may be received and analyzed to detect problems on a telecommunications network 230. One or more attributes (e.g., quality of experience (QoE) attribute) of the CDRs/TDRs may be analyzed to determine network problems.

MSP 110 may be, for example, pieces of equipment that connect to a mobile network (e.g., telecommunications network 230) and may examine packets (or other discrete pieces of information) flowing on network 230. Information on the network 230 may be, for example, related to setting up an event on telecommunications network 230 (e.g., the establishment of a telephone call,) or related to transporting the payload of the session (e.g., voice or data) from the UE to the network 230. One embodiment of the invention probes all events on the network 230.

MSP 110 may simultaneously monitor voice, video and/or data services in all major mobile and fixed networks. Packets may be captured via interface cards supporting, for example, 10 Gb interfaces with architectural support for at least 40 Gb and 100 Gb bandwidth volumes.

In one example, a network flow may include a user making a 4G call on a mobile device (UE). The call may get handed over to 3G (e.g., the user drops out of 4G coverage cells) and then this call may be handed overseas via the public switched telephone network (e.g., the wireline non VOIP network) to a destination mobile operator and finally to another UE. Each of these hops may be monitored using an MSP 110. There may be many hundreds or even thousands of MSPs on the network.

CDRs and TDRs may be produced on an ongoing automatic basis by MSP 110. The xDRs may be output to a file system on MSP 110 or may be transmitted to another location (e.g., database, email address(es), etc.). MSP 110 may include, for example, a computer running, at least, a probing application.

xDRs may vary in format according to which part of the network they are generated on. The part of the network that they are recorded on may be referred to as a 'network interface,' for example.

xDRs may have the following high level fields, for example:

Time, Subscriber Identifier, Event type, Error Code, Dimension1, . . . , DimensionN In the above example a TDR may contain a time indicator indicating when an event took place.

The subscriber identifier may be a unique identifier for a user of the telecommunications network 230. For example, an international mobile subscriber identity (IMSI) (e.g., printed on your SIM card in the 2/3G network), a telephone number or even an IP address. The subscriber identifier may be a field that uniquely identifies the subscriber.

The event type may identify a type of user initiated and/or network initiated event the xDR records (e.g., a telephone call, a data session, a registration on the network, etc.). The number of different event types may be in the thousands.

The error code may identify where the event type succeeded or not, and if it did not succeed what caused the error. For example, when registering onto a SIP network, if the error code attribute is non-zero, then an error has occurred with the process. There may be many possible errors reported by the network or the device itself. For example, error 404 in interne browsing indicates that the website being accessed by the device is not found. Each protocol examined by probes has a unique set of error codes covering all abnormal possibilities. These error codes may be defined, for example, in the 3GPP specifications for UMTS, and for each protocol there may be an individual set of specifications from standards bodies. Thousands of abnormal error codes may exist.

The error code field may also contain an indicator of a poor scalar variable such as, for example, voice quality, throughput of data, success ratios of aggregated events, etc. The error code may not be a transactional code from the network or from the UE. In the case of scalar measurements, for example, MSP 110 may for every call, transaction and/or event in progress, use qualitative and statistical techniques to determine the quality of service. For example, in HTTP, MSP 110 may measure the number of bytes downloaded, and the time taken to do this. The quality metric derived here may be throughput which is the number of bytes downloaded divided by the time taken. In another example, MSP 110 may monitor the actual voice quality for each call in progress using statistical techniques based on the number of packets lost and/or the delays in the network, and use this to create a MOS score that rates call quality (e.g., on a scale between 1 and 5). For error code measurements, these may be returned in the transactions that are received either from the UE or from the network. In the example of congestion, the network may respond to a request to make a call with 'Too much congestion.' Whereas a UE may transmit a similar message to indicate that it was no longer able to complete downloading a segment of data, such as an interrupted web session. In these cases the actual codes may be sent across the network and originate from one of the network elements and/or from the UE Dimension1, . . . , DimensionN may refer to a xDR type having its own list of unique fields that are related to the xDR but may vary from one network interface to another. These may be used as a set of scan dimensions.

In one example, for a wire line SS7 call the xDR may have the following Dimension fields: Originating Point Code, Destination Point Code, and/or Trunk. Originating/Destination Point code may be a unique address of the network elements in the voice network (e.g., similar to IP addresses in an IP network). Trunk may be an identifier of a circuit for voice flowing through the network.

In another example, for a 3G data session the xDR may have the following Dimension fields: Handset Type, Website visited, and/or Cell Identifier. Handset Type may contain 'iphone 4s', website visited may contain 'www.facebook.com,' and cell identifier may be the unique numeric identifier given to the connected cell tower by the network.

In the above examples, dimension1 . . . dimension may vary, but a common feature may be that these dimensions may be used in the case/root cause analysis (e.g., the scanning phase) to identify possible causes of an initial spike of bad experiences for a set of subscribers, for example.

xDRs may be transferred automatically to a central location called, for example, a landing zone or central database server 210. Central database server 210 may include a file system, database, or other digital repository on one or more computers or computer systems. At the central location, an application server may house both the landing zone and for example, an SIWIH application. The SIWIH application may process xDRs in an automatic fashion as xDRs are received and/or periodically (e.g., every n seconds, where n may be configurable).

Illustrative Processing

Figure 3:
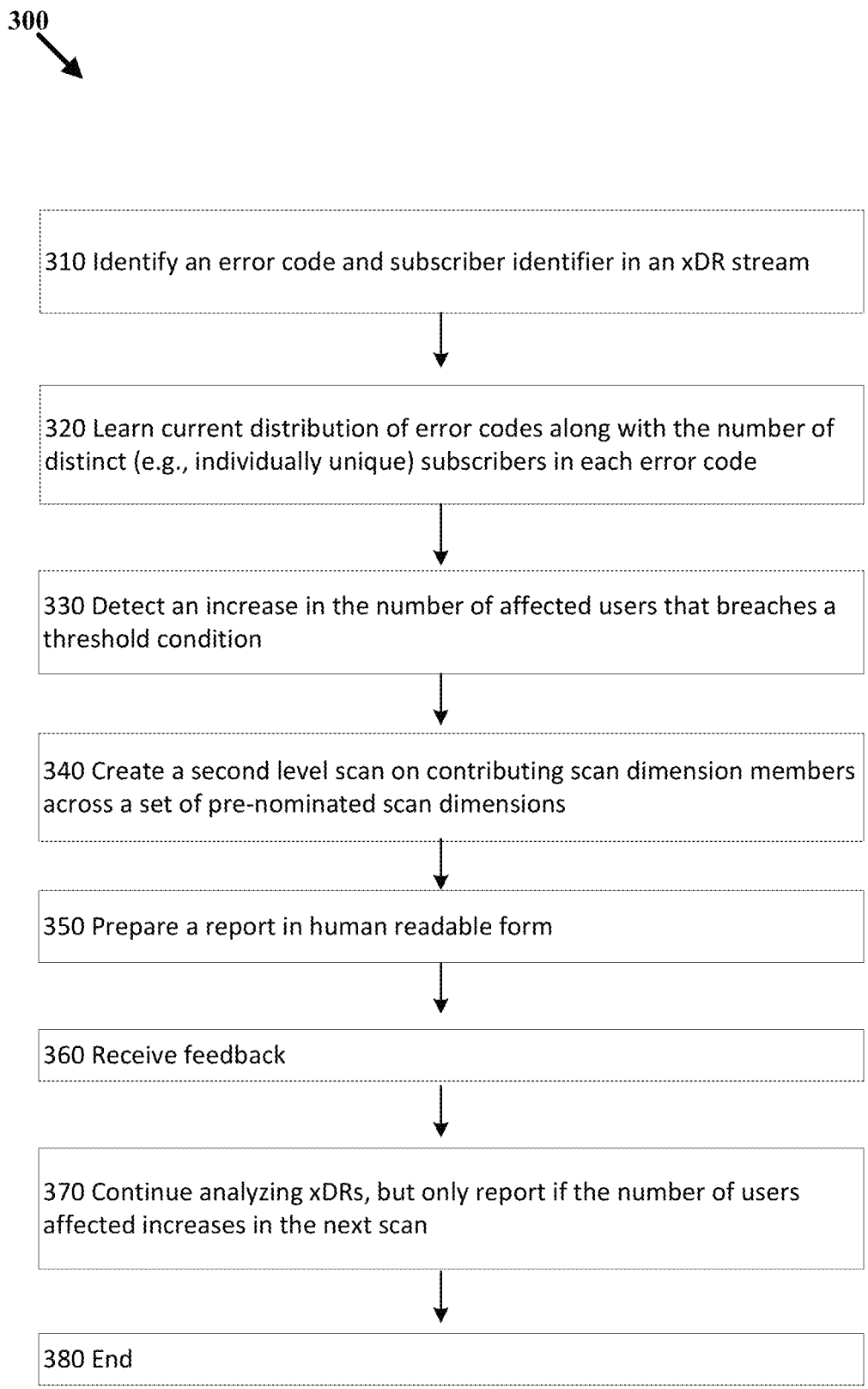
FIG. 3 depicts an example flowchart describing processing performed in an illustrative embodiment.

FIG. 3 depicts an example flowchart 300 describing processing performed in an illustrative embodiment.

In 310, an error code and subscriber identifier in an xDR stream may be identified. A stream of xDRs may be transmitted from multiple MSPs 110. The xDRs may represent all events from network 230 running continuously. In one embodiment, over 10 billion xDRs (representing network events) may be received each day by central database server 210 from network 230 covering all network elements and covering all users. The xDR stream may be split by protocol. For example, central database server 210 may receive a batch of xDRs containing VOIP call detail records, and another containing LTE call detail records, and another containing SMS records. Each xDR stream may have a slightly different format as attributes may vary from protocol to protocol. In an embodiment of the invention, a number of different xDR types (e.g., Gn signaling and user plance detail records, SS7 detail records, VOIP Call Detail Records, IuPS Signaling xDRs, LTE Signaling xDRs) may be processed. Each xDR type may have one or more error code fields.

A computerized system running in the landing zone, for example, may have multiple instances of SIWIH software running. Each instance of the running SIWIH may analyze its own error code. Because each protocol may generate a slightly different set of xDRs (all at the same time) each type of xDR corresponding to each protocol may be analyzed using a separate instance of SIWIH (e.g., multiple copies of the program running simultaneously on the same computer or computer system). In one embodiment, one instance of SIWIH looks at bad SMS events, another looks at bad Web events, another looks at bad registration events on LTE, etc. . . .

The error code field may be specified in a configuration file allowing the system to analyze different types of input xDR. For example, each xDR type may have a single subscriber identifier field. Each instance of the running SIWIH may look at its own subscriber identifier. xDRs may be filtered by error code prior to reaching the instance of SIWIH. For example, xDRs that contain a zero error code may be discarded as it may be assumed a zero error code is a success. The subscriber identifier field may be specified in, for example, a configuration file allowing different instances of SIWIH to be adapted to analyze different types of input xDR. For example, the subscriber identifier in a 3G network is the international mobile subscriber identifier (IMSI) and may be printed on the SIM card in a GSM phone and may be unique to every subscriber. Another example is a telephone number (MSISDN).

An embodiment of the invention may load a configuration file on startup. The configuration file may provide an initial set of startup parameters. For example, the configuration file may identify an error code field and/or a subscriber identifier field for the system to analyze. From 310, flow may move to 320.

In 320, a current distribution of error codes along with the number of distinct (e.g., individually unique) subscribers in each error code may be learned. At the landing zone, based on the information from the xDRs, the current distribution of error codes and number of distinct subscribers affected may be recorded.

In a software embodiment, the SIWIH algorithm may cycle through an automated process waiting for new xDRs that may be available for processing. The xDRs may have been automatically transferred from MSP 110 (e.g., individual probes) over, for example, a wide area network.

As new xDRs are received, the system (e.g., SIWIH) may perform an analysis of the new xDR and may create a list of error codes and a distinct count of subscriber identifiers, where error code may be the error code from the received xDR. The distinct count of subscriber identifiers may be the number of distinct values in the set containing a list of subscriber identifiers.

For example, in the following observed sample of (error code, subscriber identifier): (fail, userA), (fail, userB), (fail, userB), (fail, userB); the distinct count of the set {list of subscriber identifiers} i.e. {userA, userB, userB, userB} would be 2, and not 4. The resultant (error code, distinct count of subscriber identifiers) tuple recorded by SIWIH for this data set would be: (fail, 2). In this example, 'fail' has only been seen across 2 subscribers.

In another example, the observed sample of (error code, subscriber identifier) might be: (Fail reason 1, userA), (Fail reason 2, userB), (Fail reason 1, userC), (Fail reason 2, userB). The resultant (error code, distinct count of subscriber identifiers) tuple recorded would be: (Fail reason 1, 2), (Fail reason 2, 1). In other words, 'Fail reason 1' has been seen to affect 2 users (userA and userC) and 'Fail reason' 2 has been seen to affect 1 user (user B).

These tuples may be recorded along with the time period of the recording. Over a period of time, error distributions may develop and the system may learn the existing pattern of number of affected users or the incidence of errors for each attribute. The error distributions may be used, for example, as a baseline and deviations from the baseline may be used to detect errors. From 320 flow may move to 330.

In 330, while the error distributions from 320 are continuing to be recorded, the system may detect an increase in the number of affected users that breaches a threshold condition. The threshold condition may include, for example, exceeding a limit for a particular error code. For example, an error code may have an associated increase in the number of distinct users. 330 may identify whether one user is experiencing many errors or if multiple users are receiving one or more errors (e.g., the number of users affected by a problem type). Once a breach is detected, a case may be opened which may contain, for example, the error code and the number of users affected.

The breach may be detected using several different techniques. For example, one technique involves reaching a base level of b affected UEs. Another technique involves an increase of i % over a previous recorded number of affected UEs.

An example of the first technique may include, for example, where b is set in a configuration file to be 1000 and a resultant data set of (subscriber identifier, distinct count of subscriber identifiers) includes: record 1: (Fail reason 1, 900), record 2: (Fail reason 1, 978), and record 3: (Fail reason 1, 1001). In this example, no spike may be detected in records 1 and 2. However, a spike may be detected in record 3 as the current distinct count has 1001 which is greater than b=1000.

An example of the second technique may include, for example, where i % is set in a configuration file to 50 and a resultant data set of (subscriber identifier, distinct count of subscriber identifiers) includes: record 1: (Fail reason 1, 20), record 2: (Fail reason 1, 20), record 3: (Fail reason 1, 20), record 4: (Fail reason 1, 30). In this example, no spike may be detected in records 1-3. However, a spike may be detected in record 4 as the data indicates at least a 50% increase over a previous distinct count for the same error.

Once a spike is detected, the error code and distinct number of users may be recorded along with a link to each of the associated xDRs that made up the calculation. This set of information may comprise a case and may trigger, for example, a root cause analysis phase. From 330 flow may move to 340.

In 340, a second level scan may be performed on contributing scan dimension members across a set of pre-nominated scan dimensions. The contributing dimensions to a case may be discovered where the case may include a recorded set of affected xDRs along with an error code and a distinct number of UEs affected at a given time period. This scan may detect attributes that are common to the UEs experiencing errors. Common issues may include, for example, network elements, handset types, radio towers; etc.

For example, the configuration file may defined a set of contributing or scan dimensions that are unique for each xDR type. These dimensions may be analyzed to determine whether or not within each dimension member values are shared across the data that is part of the case.

For example, in a case of (Fail Reason1, 5), the associated scan dimensions may include (cell, handset, application), with a dataset including: (cell1, iphone, facebook); (cell2, iphone, facebook); (cell3, iphone, facebook); (cell4, iphone, facebook); (cell5, iphone, facebook). Here, there is a 100% match on iphone and facebook, and a 20% match on cell (as there are 5 examples of cell, a spread in effect).

The matching percentage may be configured in, for example, the configuration file. In one example, the configuration file may indicate that if over 20%, then the affected dimension members are stored. In the above example, the 100% match on iphone and facebook would mean that two dimension members would be stored as part of the root cause matching.

This techniques may be repeated across all scan dimensions for each case. From 340 flow may move to 350.

In 350, a report may be prepared for one or more users. In other words, the relevant errors in the case may be parsed and converted into a human readable text string (e.g., the case may be translated into readable English). The report may include the contributing scan dimensions and scan results. Users may then take action based on the report.

In one example, the case may include: a time period (T), an error code (E), a number of affected subscribers (N), and a set of matching contributing dimensions ({C}) (e.g., identified in 340). The human readable text may be provided in the following format: at time period T, there are N subscribers affected by error E, and that this issue is primarily related to the following causes C. Examples of these variables may include: T=12:00 1 January 2014; N=5; E='congestion'; and the set {C}={<handset=iphone>, <application=facebook>}. This example may produce: at time period 12:00 1 January 2014 there are 5 users affected by error code 'Congestion', and that this issue is primarily related to the following causes: handset=iphone, application=facebook. From 350 flow may move to 360.

At 360, The system may receive feedback based on the report. For example, recipients of the report may choose to indicate whether this type of error is important and trigger some other action or should be suppressed and not reported in the future (e.g., like or dislike). For example, reports where the common attribute is, for example, a particular cell tower, a particular website that all the problems are centering around, or a handset color may not be relevant or may not be of interest to the recipients. Accordingly, the system may suppress future reports based on this attribute. On the other hand, should the report recipient indicate that this type of report is important, the system will continue to report errors with similar attributes. Additionally, the user could trigger some other form of action. Actions may include, for example, initiating a workflow event in the customer care department; triggering an account team of an affected large account to proactively contact the affected customer and inform them that they are aware of the issues; to automatically open a support call with other departments to resolve the issue (e.g., if the problems are focused around a new type of handset, then the handset introduction team may be triggered to look at the problem). Other actions may involve a deeper analysis of the problem in question (e.g., send me—as the investigator of the problems—a list of all these users with a report of their handsets and account info via email). Further, case notes may be added to augment the semantic cause. From 360 flow may move to 370.

At 370, xDRs may be continued to be analyzed, however, reports may only be issued if the number of affected users increases. In other words, the system may continue to scan for other issues, or current cases where the number of affected users (e.g., with the same error code, but with an updated time period) increases. This avoids a report issuing (e.g., users receiving) the same error over and over again unless the problem has become worse from the perspective of the number of users affected. From 370, flow may move to 380 and end.

Illustrative Computer System

Figure 4:
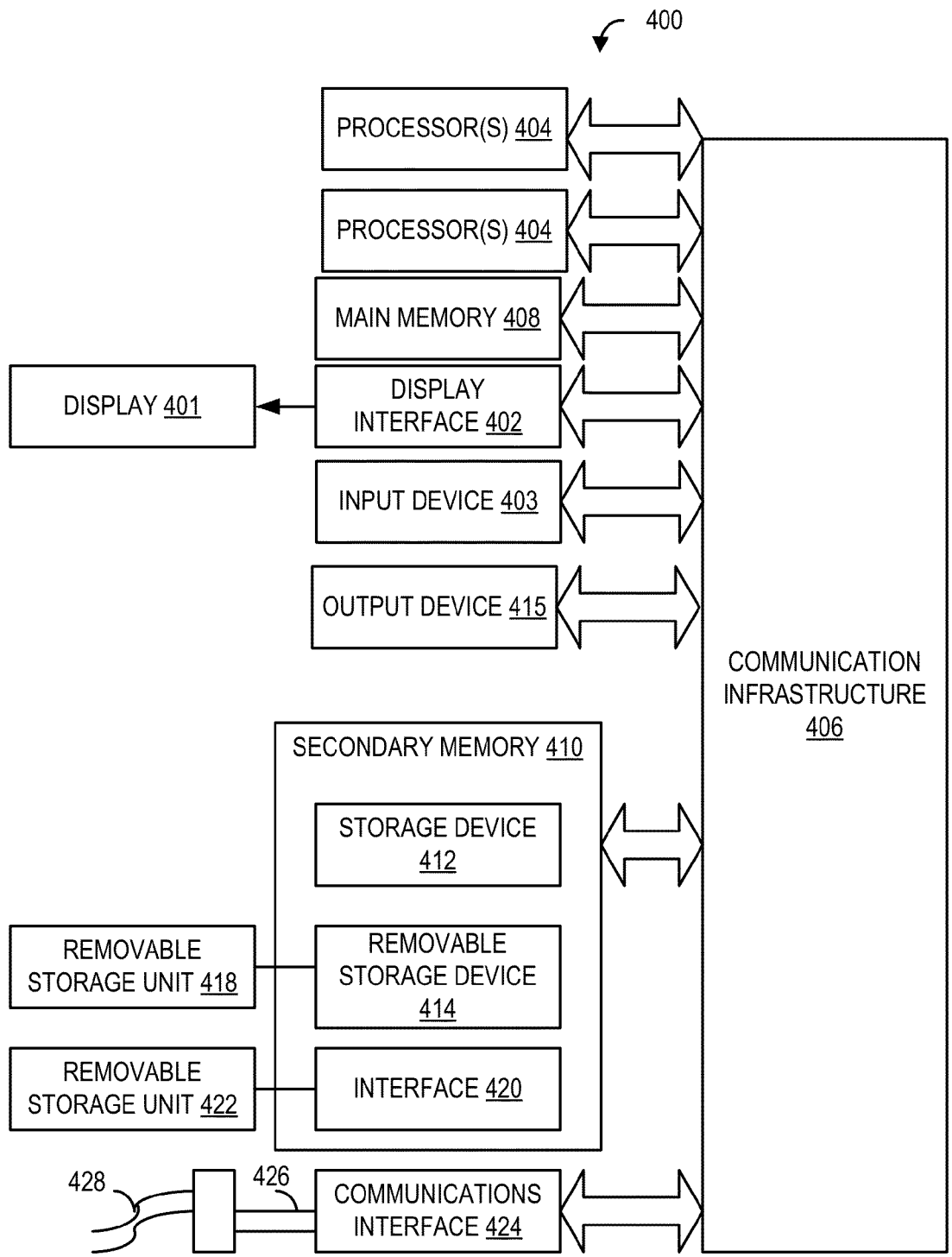
FIG. 4 depicts an example computer system that may be used in implementing an illustrative embodiment of the present invention.

FIG. 4 depicts an illustrative computer system that may be used in implementing an illustrative embodiment of the present invention. Specifically, FIG. 4 depicts an illustrative embodiment of a computer system 400 that may be used in computing devices such as, e.g., but not limited to, standalone or client or server devices. FIG. 4 depicts an illustrative embodiment of a computer system that may be used as client device, or a server device, etc. The present invention (or any part(s) or function(s) thereof) may be implemented using hardware, software, firmware, or a combination thereof and may be implemented in one or more computer systems or other processing systems. In fact, in one illustrative embodiment, the invention may be directed toward one or more computer systems capable of carrying out the functionality described herein. An example of a computer system 400 is shown in FIG. 4, depicting an illustrative embodiment of a block diagram of an illustrative computer system useful for implementing the present invention. Specifically, FIG. 4 illustrates an example computer 400, which in an illustrative embodiment may be, e.g., (but not limited to) a personal computer (PC) system running an operating system such as, e.g., (but not limited to) MICROSOFT® WINDOWS® NT/98/2000/XP/Vista/Windows 7/etc. available from MICROSOFT® Corporation of Redmond, Wash., U.S.A. or an Apple computer executing MAC® OS or iOS from Apple® of Cupertine, Calif., U.S.A. However, the invention is not limited to these platforms. Instead, the invention may be implemented on any appropriate computer system running any appropriate operating system. In one illustrative embodiment, the present invention may be implemented on a computer system operating as discussed herein. An illustrative computer system, computer 400 is shown in FIG. 4. Other components of the invention, such as, e.g., (but not limited to) a computing device, a communications device, a telephone, a personal digital assistant (PDA), an iPhone, a 3G wireless device, a wireless device, a personal computer (PC), a handheld PC, a laptop computer, a smart phone, a mobile device, a netbook, a handheld device, a portable device, an interactive television device (iTV), a digital video recorder (DVR), client workstations, thin clients, thick clients, fat clients, proxy servers, network communication servers, remote access devices, client computers, server computers, peer-to-peer devices, routers, web servers, data, media, audio, video, telephony or streaming technology servers, etc., may also be implemented using a computer such as that shown in FIG. 4. In an illustrative embodiment, services may be provided on demand using, e.g., an interactive television device (iTV), a video on demand system (VOD), via a digital video recorder (DVR), and/or other on demand viewing system. Computer system 400 may be used to implement the network and network components as described in FIGS. 1 and 2.

The computer system 400 may include one or more processors, such as, e.g., but not limited to, processor(s) 404. The processor(s) 404 may be connected to a communication infrastructure 406 (e.g., but not limited to, a communications bus, cross-over bar, interconnect, or network, etc.). Processor 404 may include any type of processor, microprocessor, or processing logic that may interpret and execute instructions (e.g., for example, a field programmable gate array (FPGA)). Processor 404 may comprise a single device (e.g., for example, a single core) and/or a group of devices (e.g., multi-core). The processor 404 may include logic configured to execute computer-executable instructions configured to implement one or more embodiments. The instructions may reside in main memory 408 or secondary memory 410. Processors 404 may also include multiple independent cores, such as a dual-core processor or a multi-core processor. Processors 404 may also include one or more graphics processing units (GPU) which may be in the form of a dedicated graphics card, an integrated graphics solution, and/or a hybrid graphics solution. Various illustrative software embodiments may be described in terms of this illustrative computer system. After reading this description, it will become apparent to a person skilled in the relevant art(s) how to implement the invention using other computer systems and/or architectures.

Computer system 400 may include a display interface 402 that may forward, e.g., but not limited to, graphics, text, and other data, etc., from the communication infrastructure 406 (or from a frame buffer, etc., not shown) for display on the display unit 401. The display unit 401 may be, for example, a television, a computer monitor, or a mobile phone screen. The output may also be provided as sound through a speaker.

The computer system 400 may also include, e.g., but is not limited to, a main memory 408, random access memory (RAM), and a secondary memory 410, etc. Main memory 408, random access memory (RAM), and a secondary memory 410, etc., may be a computer-readable medium that may be configured to store instructions configured to implement one or more embodiments and may comprise a random-access memory (RAM) that may include RAM devices, such as Dynamic RAM (DRAM) devices, flash memory devices, Static RAM (SRAM) devices, etc.

The secondary memory 410 may include, for example, (but is not limited to) a hard disk drive 412 and/or a removable storage drive 414, representing a floppy diskette drive, a magnetic tape drive, an optical disk drive, a compact disk drive CD-ROM, flash memory, etc. The removable storage drive 414 may, e.g., but is not limited to, read from and/or write to a removable storage unit 418 in a well-known manner. Removable storage unit 418, also called a program storage device or a computer program product, may represent, e.g., but is not limited to, a floppy disk, magnetic tape, optical disk, compact disk, etc. which may be read from and written to removable storage drive 414. As will be appreciated, the removable storage unit 418 may include a computer usable storage medium having stored therein computer software and/or data.

In alternative illustrative embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 422 and interfaces 420, which may allow software and data to be transferred from the removable storage unit 422 to computer system 400.

Computer 400 may also include an input device 403 which may include any mechanism or combination of mechanisms that may permit information to be input into computer system 400 from, e.g., a user. Input device 403 may include logic configured to receive information for computer system 400 from, e.g. a user. Examples of input device 403 may include, e.g., but not limited to, a mouse, pen-based pointing device, or other pointing device such as a digitizer, a touch sensitive display device, and/or a keyboard or other data entry device (none of which are labeled). Other input devices 403 may include, e.g., but not limited to, MSP 110, a biometric input device, a video source, an audio source, a microphone, a web cam, a video camera, and/or other camera.

Computer 400 may also include output devices 415 which may include any mechanism or combination of mechanisms that may output information from computer system 400. Output device 415 may include logic configured to output information from computer system 400. Embodiments of output device 415 may include, e.g., but not limited to, display 401, and display interface 402, including displays, printers, speakers, cathode ray tubes (CRTs), plasma displays, light-emitting diode (LED) displays, liquid crystal displays (LCDs), printers, vacuum florescent displays (VFDs), surface-conduction electron-emitter displays (SEDs), field emission displays (FEDs), etc. Computer 400 may include input/output (I/O) devices such as, e.g., (but not limited to) input device 403, communications interface 424, cable 428 and communications path 426, etc. These devices may include, e.g., but are not limited to, a network interface card, and/or modems.

Communications interface 424 may allow software and data to be transferred between computer system 400 and external devices.

In this document, the terms "computer program medium" and "computer readable medium" may be used to generally refer to media such as, e.g., but not limited to, removable storage drive 414, a hard disk installed in hard disk drive 412, flash memories, removable discs, non-removable discs, etc. In addition, it should be noted that various electromagnetic radiation, such as wireless communication, electrical communication carried over an electrically conductive wire (e.g., but not limited to twisted pair, CATS, etc.) or an optical medium (e.g., but not limited to, optical fiber) and the like may be encoded to carry computer-executable instructions and/or computer data that embodiments of the invention on e.g., a communication network. These computer program products may provide software to computer system 400. It should be noted that a computer-readable medium that comprises computer-executable instructions for execution in a processor may be configured to store various embodiments of the present invention. References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic.

Further, repeated use of the phrase "in one embodiment," or "in an illustrative embodiment," do not necessarily refer to the same embodiment, although they may.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product, such as, for example, a scientific modeling product. It may be downloadable from a network, for example, a website, as a stand-alone product or as an add-in package for installation in an existing software application. It may also be available as a client-server software application, or as a web-enabled software application. It may also be part of a system for identifying network problems as described above.

Embodiments of the present invention may include apparatuses for performing the operations herein. An apparatus may be specially constructed for the desired purposes, or it may comprise a general purpose device selectively activated or reconfigured by a program stored in the device.

Embodiments may be embodied in many different ways as a software component. For example, it may be a stand-alone software package, or it may be a software package incorporated as a "tool" in a larger software product. It may be downloadable from a network, for example, a website, as a stand-alone product or as an add-in package for installation in an existing software application. It may also be available as a client-server software application, or as a web-enabled software application.

While various embodiments of the present invention have been described above, it should be understood that they have been presented by way of example only, and not limitation. Thus, the breadth and scope of the present invention should not be limited by any of the above-described illustrative embodiments, but should instead be defined only in accordance with the following claims and their equivalents.

What is claimed is:

1. A system for identifying communication problems comprising:
   a telecommunications network;
   one or more telecommunications probes coupled to the telecommunications network, the telecommunications probes capable of generating detailed records describing one or more network events;
   one or more processors in communication with the telecommunications probes; and
   memory coupled to the one or more processors, the memory storing the detailed records received by the telecommunications probes and the memory storing instructions executable by the one or more processors, the instructions operable to:
identify detailed records that indicate an event failure including error codes and associated subscriber identifiers;
learn a distribution of error codes and associated subscriber identifiers;
detect event failures that indicate an increase in the number of subscriber identifiers for an error code;
analyze attributes of the detected event failures to identify one or more common attributes between the detected event failures;
prepare a report identifying a network issue based on the identified one or more common attributes between the detected event failures;
transmit the report; and
receive feedback based on the report.

2. The system of claim 1, wherein an event comprises at least one of: phone on, phone connecting to the network, acquiring new base station, SMS, a data session, a phone registering on the network, or Internet access.

3. The system of claim 1, wherein the increase in the number of subscriber identifiers for an error code crosses a threshold condition.

4. The system of claim 1, wherein the common attributes to identify are listed in a configuration file.

5. The system of claim 1, wherein the attributes comprise at least one of:
telephone numbers of requesting and receiving devices, location of devices, communication paths used, base station, signal tower, time, GGSN, SGSN, handset, network element, APN, cell technology, radio technology, roaming type, country, carrier, source number, destination number, destination category, destination nature of address, destination numbering plan, OPC/DPC, release location, routing natr, routing numbering plan, source category, source natr, source numbering plan, teleservice information, transmission media requirement, trunk, quality attribute, or mean opinion score.

6. A method of identifying communication problems comprising:
loading, by a computer, a first plurality of detailed records, wherein the detailed records contain attributes for one or more network events;
identifying, by the computer, a second plurality of detailed records from the first plurality of detailed records, wherein the second plurality of detailed records indicate an event failure;
detecting, by the computer, a signature in the second plurality of detailed records, wherein the signature is a pattern indicating a known failure type and associated attributes;
learning, by the computer, a typical pattern of attributes associated with the signature;
identifying, by the computer, a deviation from the learned pattern;
detecting, by the computer, one or more common attributes in a plurality of event failures based on the deviation from the learned pattern;
determining, by the computer, a problem based on the one or more common attributes in a plurality of event failures;
reporting, by the computer, the problem; and
receiving, by the computer, input on the problem.

7. The method of claim 6, wherein deviations may be a percentage deviation in an attribute or an increase in the number of users affected by the network event.

8. The method of claim 6, wherein the one or more common attributes are listed in a configuration file.

9. The method of claim 6, wherein the one or more common attributes in a plurality of event failures comprises at least one of:
telephone numbers of requesting and receiving devices, location of devices, communication paths used, base station, signal tower, time, GGSN, SGSN, handset, network element, APN, cell technology, radio technology, roaming type, country, carrier, source number, destination number, destination category, destination nature of address, destination numbering plan, OPC/DPC, release location, routing natr, routing numbering plan, source category, source natr, source numbering plan, teleservice information, transmission media requirement, trunk, quality attribute, or mean opinion score.

10. The method of claim 6, wherein input on the problem comprises one of an indication that future reports with the same attributes will be suppressed or an indication that future reports with the same attributes will be encouraged.

11. The method of claim 6, wherein the one or more network events comprise at least one of: phone on, phone connecting to the network, acquiring new base station, SMS, a data session, a phone registering on the network, or Internet access.

12. A non-transitory computer-readable medium comprising instructions executable by one or more processors to identify communication problems, the computer-readable medium comprising one or more instructions for:
loading a first plurality of detailed records, wherein the detailed records contain attributes for one or more network events;
identifying a second plurality of detailed records from the first plurality of detailed records, wherein the second plurality of detailed records indicate an event failure;
detecting a signature in the second plurality of detailed records, wherein the signature is a pattern indicating a known failure type and associated attributes;
learning a typical pattern of attributes associated with the signature;
identifying a deviation from the learned pattern;
detecting one or more common attributes in a plurality of event failures based on the deviation from the learned pattern;
determining a problem based on the one or more common attributes in a plurality of event failures;
reporting the problem; and
receiving input on the problem.

13. The computer-readable medium of claim 12, wherein deviations may be a percentage deviation in an attribute or an increase in the number of users affected by the network event.

14. The computer-readable medium of claim 12, wherein the one or more common attributes between a plurality of event failures comprises at least one of:
telephone numbers of requesting and receiving devices, location of devices, communication paths used, base station, signal tower, time, GGSN, SGSN, handset, network element, APN, cell technology, radio technology, roaming type, country, carrier, source number, destination number, destination category, destination nature of address, destination numbering plan, OPC/DPC, release location, routing natr, routing numbering plan, source category, source natr, source numbering plan, teleservice information, transmission media requirement, trunk, quality attribute, or mean opinion score.

15. The computer-readable medium of claim 12, wherein input on the problem comprises one of an indication that future reports with the same attributes will be suppressed or an indication that future reports with the same attributes will be encouraged.

16. The computer-readable medium of claim 12, wherein the one or more common attributes are listed in a configuration file.

17. The computer-readable medium of claim 12, wherein the one or more network events comprise at least one of: phone on, phone connecting to the network, acquiring new base station, SMS, a data session, a phone registering on the network, or Internet access.

* * * * *